April 16, 1963 L. A. TATE 3,086,198

CORE CODE TRANSLATOR

Filed July 24, 1958 2 Sheets-Sheet 1

April 16, 1963 L. A. TATE 3,086,198

CORE CODE TRANSLATOR

Filed July 24, 1958 2 Sheets-Sheet 2

United States Patent Office 3,086,198

Patented Apr. 16, 1963

3,086,198

CORE CODE TRANSLATOR

Lawrence A. Tate, Poughkeepsie N.Y., assignor to International Business Machines Corporation, New York, N.Y., a corporation of New York Filed July 24, 1958, Ser. No. 750,747
3 Claims. (Cl. 340—347)

This invention relates to magnetic matrices and computing devices, and particularly to core code translators.

Magnetic matrix memories have heretofore been proposed which comprise a plurality of rows and columns of magnetic cores which may be selectively energized in dependence upon the digits present in an input character in order to establish a magnetic state of one of the magnetic cores indicative of the applied input character. In such systems, it has heretofore been deemed necessary to insure that there be multi-coincidence of excitation of the cores in order to accomplish the aforesaid intended results. Where multi-coincidence is necessary to the operation of a core code translator, time-errors in the reproduction of the several bits which make up each input character may introduce error which, of course, cannot be tolerated in computing equipment.

In accordance with the present invention, neither coincidence nor non-coincidence is required. Accordingly, input characters applied to a core code translator from a multi-track magnetic tape are properly entered notwithstanding the presence of skew or a slight angularity across the tape and relative to a plurality of pickup heads.

In carrying out the present invention, the plurality of cores making up the core code translator are provided in adequate number so that each may represent one of the possible input characters to be applied thereto. The cores, magnetic elements or devices have hysteresis loops which are described by those skilled in the art as generally square. Each core is provided with a reset winding for each bit of each order. Input circuits, one for each bit of each order of said characters, are arranged to include a plurality of the corresponding reset windings. With the aforesaid arrangement and concept, upon energization of each input circuit corresponding with each bit of the input character to be translated, all but one of the cores will be changed from one magnetic condition to another. It thereupon becomes easy to cause the single core to be flipped or reset for generation of an output signal for identification of the core representative of the applied input character.

The magnetomotive force applied to each core representative of each selected bit is adequate to reset the core and thus there are avoided problems such as the addition of magnetomotive forces to produce magnitudes adequate to reset the cores and there are likewise avoided the problems of inhibit windings for producing magnetomotive forces which prevent resetting of certain of the cores, these factors all being present in systems requiring multi-coincidence of operation of the input circuits of matrix memories.

Figure 1:
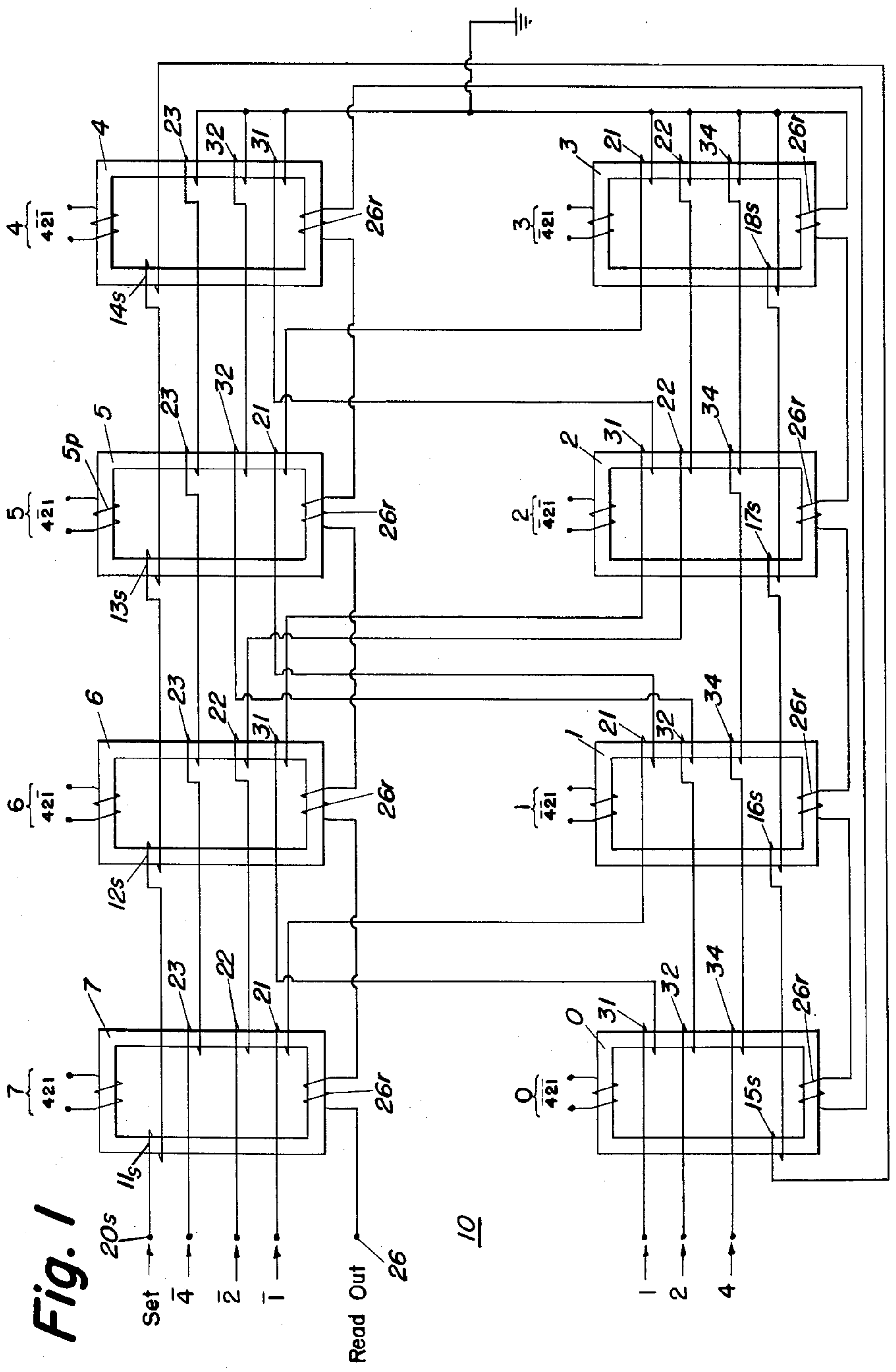

For further objects and advantages of the invention and for a discussion of typical embodiments, reference is made to the following description taken in conjunction with the accompanying drawings, in which:

FIG. 1 schematically illustrates one embodiment of the invention; and

Figure 2:
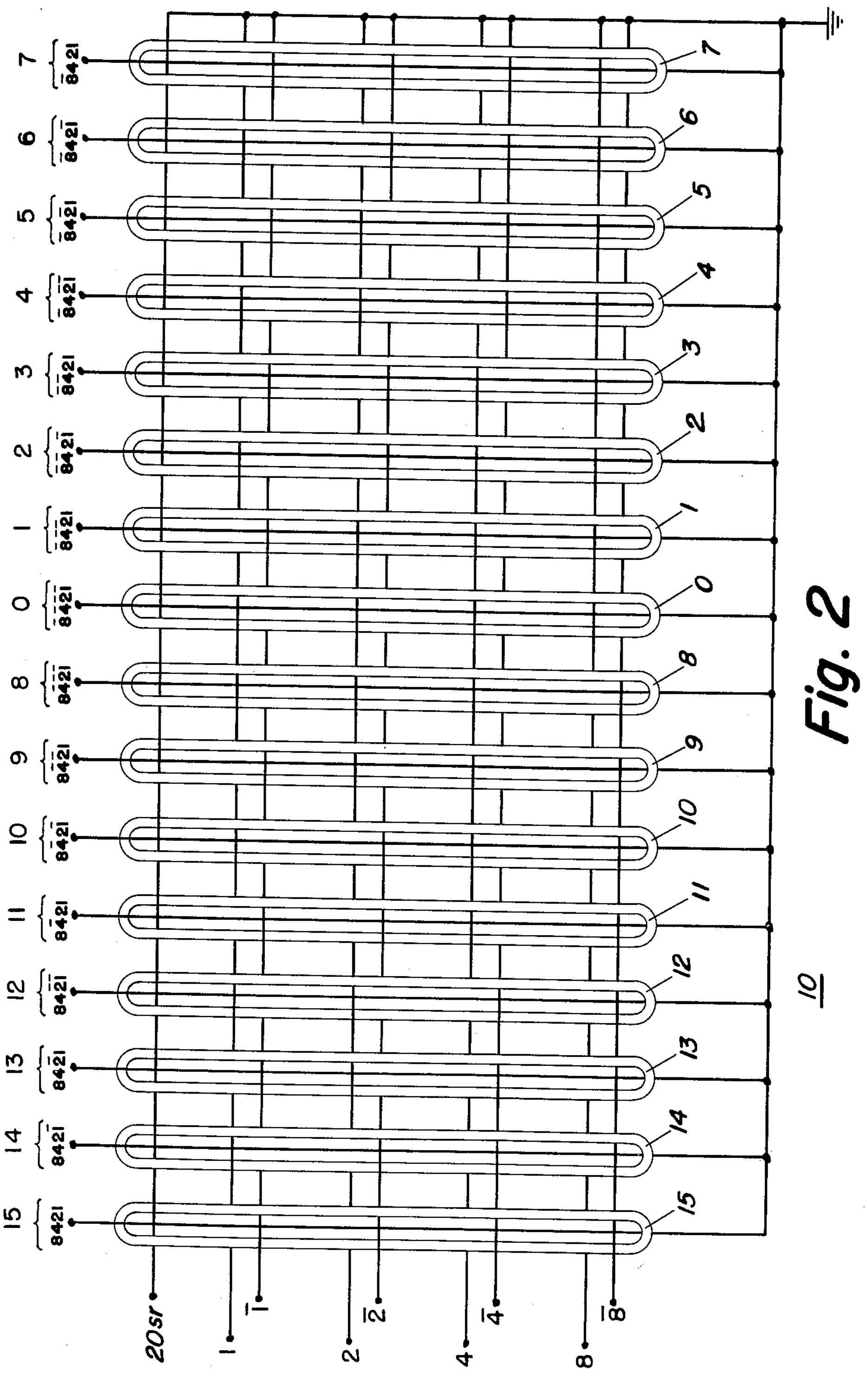

FIG. 2 illustrates a further embodiment of the invention.

Referring now to FIG. 1, there has been illustrated a core code translator 10 comprising cores 0–7 respectively representative of all possible input characters which may be derived from the first three orders in the binary system. For example, the core 0, representative of zero in the decimal system, has a caption indicating that it identifies in the binary system "$\bar{4}$ $\bar{2}$ $\bar{1}$" (not 4, not 2 and not 1. Similarly, the core 1 represents unity, as $\bar{4}$ $\bar{2}$ 1, and core 7 represents 7 as 4 2 1. Each core is provided with a set winding respectively bearing the reference characters $11_s$ to $18_s$. These set windings are connected in a control circuit, one side of which is illustrated at ground potential, and the other side of which is indicated by the input terminal $20_s$. An impulse applied to the input circuit at $20_s$ generates magnetomotive forces in each core in direction and of magnitude to set each core, that is, to establish a predetermined state of magnetization therein.

There are provided input circuits corresponding in number with the various digits which make up all possible input characters for the translator 10. The input terminals of these circuits have been labeled to be the same as the varying input digits, that is, respectively 1, 2, 4, $\bar{1}$, $\bar{2}$, $\bar{4}$. It will be observed that each core is provided with a reset winding in an input circuit representative of a bit differing from that in the corresponding order of the associated core. For example, the $\bar{4}$ input circuit includes a reset winding 23 for core 7 since $\bar{4}$ differs from or is the complement of the 4 in the third order of the character represented by core 7. Accordingly, corresponding reset windings 23 are associated with cores 6, 5 and 4 but not with cores 0–3. Similarly, the $\bar{2}$ input circuit is provided with a reset winding 22 and corresponding reset windings 22 are associated with cores 7, 6, 2 and 3 because for each said core each second order digit is 2 and differs from $\bar{2}$. The foregoing arrangement in carried through for each of the remaining input circuits $\bar{1}$, 1, 2 and 4 having reset windings 21, 31, 32 and 34 similarly associated with their respective cores.

At the start of operation, all the cores are placed in the set condition by means of an impulse applied to the set windings. Then for example, if it be desired to apply the input character 4 $\bar{2}$ 1 to the translator 10, there will be applied to input terminals 4, $\bar{2}$, 1 input pulses having the same polarity as the set impulses. The impulse for input circuit 4 resets cores 0, 1, 2 and 3 in a magnetic state opposite to that established by the set impulse. The input pulse applied to the $\bar{2}$ input circuit reset cores 7 and 6. That impulse also is applied to reset windings 22 associated with cores 2 and 3, but since these have already been reset, it is without further effect upon them. The input pulse applied to the input circuit 1 is without effect upon cores 0, 6 and 2 which have already been reset. It does not core 4.

It is to be noted that core 5 is not reset by the application of the aforesaid three input pulses. It is to be further observed that it is immaterial in what order or in what time sequence the three pulses are applied to the input circuits 4, $\bar{2}$ and 1. Accordingly, pulses applied to the input circuits from a magnetic tape will reset all but one of the cores though the travel path of the tape may vary due to the presence of skew with a resultant time-shift in application of the pulses to the cores.

If a read-out pulse be applied to the circuit $20_s$ in a direction to reset all cores, by applying a pulse of opposite polarity to the set impulse, it will be without effect upon any of the cores except core 5 which will thereupon be reset. Accordingly, an output winding $5_p$ will then generate an output pulse indicative of the resetting of core 5, and thus, at the time of energization of the set winding $13_s$ by the read-out pulse there will be identified by the resetting of core 5 the fact that it represents the value 5 and also 4 $\bar{2}$ 1. In general, it may be preferred to provide a read-out circuit as at 26 with read-out windings $26_r$ associated with each core for application thereto of a read-out pulse. Each read-out winding $26_r$ is wound in such direction so that when there is applied a pulse of the same polarity as the set impulse a magnetic state opposite to that established by each set winding is produced. It is to be understood that a plurality of read-out windings on each core, representing the desired output code, may be used instead of a single read-out winding per core. The core code translator of the present invention provides considerable versatility in application, as above set forth. Conventional input circuits will be provided together with conventional utilization circuits, all well-known to those skilled in the art and described at length in such texts as "Pulse and Digital Circuits," by Millman & Taub 1956, "Arithmetic Operations in Digital Computers," by R. K. Richards 1955 and "Digital Computer Components and Circuits" 1957, also by R. K. Richards.

With the above understanding of the invention, it is believed it will be readily apparent how the system functions for identification of any one of the several cores representing different input characters and also that the invention is not limited to input characters of three orders in the binary system, but is readily applicable to input characters of any selected number of orders. A system for input characters of four orders has been illustrated in FIG. 2.

The addition of the fourth order including 8 and $\bar{8}$ increases the possible number of input characters from 8 to 16. The windings in the embodiment of FIG. 2 have been shown as single conductors which thread through the respective magnetic cores. For example, the conductor from the input terminal $\mathbf{20}_{sr}$ threads through each core and upon application of an input pulse of one polarity establishes for each core a first magnetic state. The input circuit $\mathbf{20}_{sr}$ is in this modification also used for reading out to identify the core representative of a given input character. It is so used by applying thereto a pulse of polarity opposite to the initial "set" pulse. The arrangement of windings conforms with the instructions above set forth. In consequence, the coincidence of application of input pulses is unnecessary and they may be applied either in time-coincidence or serially.

Assuming now that the input character to be applied to the translator 10 is 11, in the decimal system or in the binary system, 8 $\bar{4}$ 2 1. Accordingly, there will be applied to the respective input terminals 8, $\bar{\mathbf{4}}$, 2 and 1 input impulses having a polarity opposite to the set pulse and effective to reset each core through which the respective conductors pass from the aforesaid input terminals. Thus an input pulse from input terminal 1 resets cores 14, 12, 10, 8, 0, 2, 4 and 6. The input pulse from input terminal 2 resets cores 13, 9, 1 and 5. That input pulse is ineffective upon cores 12, 8, 0 and 4 since these cores were reset by the pulse from input terminal 1. The input pulse from terminal $\bar{\mathbf{4}}$ resets cores 15 and 7 and it acts in the direction to reset cores 14, 13, 12, 4, 5, and 6. The input pulse from terminal 8 though acting in a direction to reset cores 0, 1, 2, 4, 5, 6 and 7 is effective to reset only core 3, the others having previously been reset. The end result is that all cores have been reset except core 11. Accordingly, the application of a read-out impulse to the input terminal $\mathbf{20}_{sr}$ having a polarity opposite to the set pulse, will produce no output at any output circuit with the exception of the output circuit represented by the vertical wire threading through core 11. Thus, the resultant output signal will distinctively identify core 11 representative of input character 8 $\bar{4}$ 2 1.

As indicated above, the present invention is applicable to any number of cores for any selected order of input characters. In general, it will be preferred that the core material for each core be of a material which provides a hysteresis loop of the generally rectangular shape. The magnetic material may be of 4–70 Mo-Permalloy and preferably of a plurality of laminations. Where core material such as the ferrites is utilized, multi-turn windings such as illustrated in FIG. 1 may be selected.

In the above description input pulses were applied to each input circuit labeled the same as the digits for each of the respective orders making up the input character. If, for FIG. 1, impulses for the input character 4 $\bar{\mathbf{2}}$ 1 had been applied to the terminals, $\bar{\mathbf{4}}$ 2 $\bar{\mathbf{1}}$ all of the cores would have been reset except the core 2 which is the complement of 4 $\bar{2}$ 1. Thus the invention includes the concept of energizing the reset windings in accordance with a selected combinatorial code dependent upon the bits forming the input character for selectively driving all but one of the cores in a direction to reset them.

What is claimed is:

1. In a binary-to-decimal core code translator having selected orders in the binary system in number for representation of a given number of characters in the decimal system, the combination comprising a plurality of magnetic cores, each having a first and a second magnetic state, said plurality of cores corresponding in number with said number of characters and respectively representative of said characters, a set winding and an output winding for each said core, means for applying set pulses to each of said set windings of a polarity to set all of said cores in said first magnetic state, each said core having a plurality of reset windings corresponding in number with said number of orders, input circuits corresponding in number with twice said number of orders and respectively representative of the bits of said orders and their complements, circuit connections for including in each input circuit reset windings associated with cores representative of characters each having an order which is the complement of the order represented by said input circuit, means for applying reset pulses to said input circuits corresponding with each bit of each order of the character to be translated for resetting all but one of said cores in their said second magnetic state, and means for applying to said cores read-out magnetomotive forces of magnitude and direction to reset all of said cores in their said second magnetic state whereby said single one of said cores is reset to produce an output pulse from its output winding which is indicative of the fact that said single core represents the input character to be translated.

2. In a binary-to-decimal core code translator having selected orders in the binary system in number for representation of a given number of characters in the decimal system, the combination comprising a plurality of magnetic cores each having a first and a second magnetic state, said plurality of cores corresponding in number with said number of characters and respectively representative of said characters, a set winding and an output winding for each said core, means for applying set pulses to each of said set windings of a polarity to set all of said cores in said first magnetic state, each said core having a plurality of reset windings corresponding in number with said number of orders, input circuits corresponding in number with twice said number of orders and respectively representative of the bits of said orders and their complements, circuit connections for including in each input circuit reset windings associated with cores representative of characters each having an order which is the complement of the order represented by said input circuit, means for applying reset pulses to said input circuits corresponding with each bit of the character to be translated for resetting all but one of said cores in their said second magnetic state, and means for applying read-out pulses to said set windings of a polarity opposite to that of said set pulses to reset all of said cores then in their first magnetic state to their said second magnetic state, whereby said single one of said cores is reset to produce an output pulse from its output winding in time coincidence with said applied read-out pulse, which output pulse indicates that said single core is representative of the applied input character.

3. A system for translating binary numbers having selected orders to characters in the decimal system comprising a plurality of magnetic cores each having a first and a second magnetic state, said plurality of magnetic cores corresponding in number with said number of characters and respectively representative of said characters, a set winding, a read-out winding and an output winding for each said core, means for applying set pulses to each of said set windings to set all of said cores in said first magnetic state, each said core having a plurality of reset windings corresponding in number with said number of orders, input circuits corresponding in number with twice said number of orders and respectively representative of the bits of said orders and their complements, circuit connections for including in each input circuit reset windings associated with cores representative of characters each of which includes an order which is the complement of the order represented by that input circuit, means for applying reset pulses to said input circuits corresponding with each bit of the character to be translated for resetting all but one of said cores in their said second magnetic states, and means for applying read-out pulses to said read-out windings of a polarity to reset said one core in its said second magnetic state, whereby said single one of said cores which did not have applied thereto said reset pulse is reset to produce an output pulse from its output winding in time coincidence with said read-out pulse which output pulse is indicative of the fact that said single core is representative of the input character to be translated.

References Cited in the file of this patent

UNITED STATES PATENTS

| | | |
|---|---|---|
| 2,691,152 | Stuart-Williams | Oct. 5, 1954 |
| 2,734,182 | Rajchman | Feb. 7, 1956 |
| 2,734,183 | Rajchman | Feb. 7, 1956 |
| 2,768,367 | Rajchman | Oct. 23, 1956 |
| 2,782,399 | Rajchman | Feb. 19, 1957 |
| 2,846,671 | Yetter | Aug. 5, 1958 |
| 2,920,317 | Mallery | Jan. 5, 1960 |
| 2,923,833 | Lawrence | Feb. 2, 1960 |
| 2,937,285 | Olsen | May 17, 1960 |